(12) United States Patent
Waldroff (10) Patent No.: US 12,459,554 B1
(45) Date of Patent: Nov. 4, 2025

(54) TRANSPORTABLE CHILD SEAT FOR SHOPPING CART

(71) Applicant: Erin Waldroff, Franklin, OH (US)

(72) Inventor: Erin Waldroff, Franklin, OH (US)

(*) Notice: Subject to any disclaimer, the term of this patent is extended or adjusted under 35 U.S.C. 154(b) by 0 days.

(21) Appl. No.: 18/962,043

(22) Filed: Nov. 27, 2024

(51) Int. Cl.
*B62B 3/14* (2006.01)

(52) U.S. Cl.
CPC .......... *B62B 3/1444* (2013.01); *B62B 3/1448* (2013.01); *B62B 3/1452* (2013.01)

(58) Field of Classification Search
CPC ..... B62B 3/144; B62B 3/1444; B62B 3/1448; B62B 3/1472
See application file for complete search history.

(56) References Cited

U.S. PATENT DOCUMENTS

| | | | |
|---|---|---|---|
| 3,146,026 A * | 8/1964 | Berlin .................... | A47D 1/103 297/487 |
| 4,204,695 A | 5/1980 | Salzman | |
| 5,096,260 A * | 3/1992 | Hagerstrom .......... | B62B 3/1444 5/98.1 |
| 5,810,437 A * | 9/1998 | Sharpe ................. | B62B 3/1444 297/256.17 |
| 6,036,264 A * | 3/2000 | Lucree .................... | B62B 3/144 297/229 |
| 6,582,017 B1 * | 6/2003 | Barnes ................... | B62B 3/144 297/229 |
| D484,666 S * | 12/2003 | Caya .............................. | D34/27 |
| 8,070,180 B2 | 12/2011 | Stiba | |
| D672,933 S | 12/2012 | Fredendall | |
| 8,657,304 B1 | 2/2014 | Fredendall | |
| 8,783,697 B1 * | 7/2014 | Wilhite ................ | B62B 3/1464 280/DIG. 4 |
| 2010/0276900 A1 * | 11/2010 | Giannini .............. | B62B 3/1444 280/33.993 |
| 2014/0191547 A1 * | 7/2014 | Fink ...................... | B62B 3/1444 297/256.17 |
| 2014/0232088 A1 | 8/2014 | Ektron | |
| 2017/0217340 A1 * | 8/2017 | Estraykh ................. | A47D 1/10 |
| 2018/0312186 A1 * | 11/2018 | Lopez .................... | A47D 1/006 |
| 2019/0100228 A1 * | 4/2019 | Valiulis ..................... | B62B 3/14 |

* cited by examiner

*Primary Examiner* — Brian L Swenson
(74) *Attorney, Agent, or Firm* — R. William Graham (57) ABSTRACT

A transportable child seat for use in a shopping cart includes a bottom panel, a back panel connected to the bottom panel, a pair of side panels connected to the bottom panel and the back panel, wherein the bottom panel and the back panel are of at least a width slightly less than a width of the bottom frame, an exterior of each of the back panel and the side panels include an inverted hook such that when the hook of the back panel and the hooks of the side panels are disposed over the top edge, the bottom panel is retained in a position above the bottom frame.

20 Claims, 8 Drawing Sheets

TRANSPORTABLE CHILD SEAT FOR SHOPPING CART

FIELD OF INVENTION

The present invention relates generally to the field of child seats, and particularly to child seats in shopping cart for comfort and safety of one or two children when seated in the shopping cart.

BACKGROUND OF THE INVENTION

Supermarkets and department stores provide their customers with conventional shopping carts of various sizes. Typically, these shopping carts include a large goods retaining area and pivoting or extending child seat structure, which can be extended to provide a platform where a child may be seated. These shopping cart seat structures are oriented adjacent a handle which the user grabs to push the cart. Some people use a varies or blankets covers for holding small children in place inside the platform of the shopping carts or attempting to make the rigid structure more comfortable. These shopping cart seat areas provide two openings which face the user pushing the cart and the child can place their legs through the hole, but these structures are not always desired and do not necessarily provide a suitable restraint. Thus, parents resort to various means to improve the seat structure in the way of comfort, safety, and restraint of children inside the shopping carts.

The current means for seating children in a shopping cart remain ineffective and inefficient when it comes to comfort and safety of children. Further, the shopping carts on the market typically seat one small child, and depending on the size of the child can be difficult to place their legs through the holes for their legs. Also, for mothers of twins and or multiple children these lack suitable comfort, protection, and safety for both children.

Further, mothers using other items to improve the seat structure adds yet another item to carry, such as a blanket or baby carrier which are typically heavy and are often difficult to transport in and out of the vehicle. The placement of a child in these shopping cart seat structures can be difficult, especially while handling a rather uncooperative child or multiple children at the same time.

While there has been a trend to produce more effective and user friendly shopping cart seat, further improvements in the field of child seats in shopping carts is desired offering ease of use and transportation, offering adaptability to various sized shopping carts and accommodate more than one child with effectiveness, comfort and safety. The present invention addresses the existing problems and provides related benefits.

SUMMARY OF THE INVENTION

It is an object to improve child seats, particularly those used in shopping carts.

It is another object to improve a shopping experience through an improved removable shopping car seat.

Another object is to provide a size adaptable child seat for a shopping cart.

Still another object is to provide an easily transportable child seat for a shopping cart.

Yet another object is to provide a child seat removably disposed in the goods retaining area connected to a distal end and sides of a shopping cart which opposes an end area with a handle and a foldable child seat.

Accordingly, the invention is directed to a transportable child seat for use in a goods retaining area shopping cart defined by a front frame, side frames and bottom frame, wherein a rear frame of the shopping cart includes a handle for pushing the cart. The front frame and side frames interconnect and includes a continuous top edge. The child seat includes a bottom panel, back panel connected to the bottom panel, side panels connected to the bottom panel and back panel, wherein the bottom panel and back panel are of at least a width slightly less than a width of the bottom frame. The side panels and back panel have a vertical length (or height) and the front frame and side frames which have vertical length (or height). For example, the side frames, rear frame and front frame typically have a vertical length of between 2-3 feet.

In this regard, an exterior of each of the back panel and side panels include an inverted hook which are substantially equally vertically disposed from the bottom panel such that when the hook of the back panel is disposed over the top edge of the front frame and the hooks of the side panels are disposed over the top edge of the side frames, the bottom panel is retained in a predetermined position, e.g., horizontal or generally parallel to the bottom frame and sufficiently but safely spaced from the bottom frame to provide comfort for the child to assume a sitting position with the child bottom substantially suspended above the bottom frame, e.g., 12-18 inches above the bottom frame. Accordingly, the side panels and back panel can have a height of about 12 to 16 inches, for example, providing suitable back height support. The bottom panel and optionally the back panel and side panels can include a rigid internal member, which can be made of plastic for example. The panels can each include a cushion and fabric cover material which is preferably washable. The panels can be disposed in a unitary fabric member with stitching creating pockets to contain the rigid internal member and cushion material, such as open cell foam.

The pockets for the side panels can include only cushion material which provides for easy closing and mating the panels together for transport. The back panel and bottom panel can have a complementary male and female clip portion to interconnect these panels in a transport mode. Additionally, the seat can includes a carrying strap connected to one of the panels, for example the exterior of the bottom panel so that when in transport mode, the parent can simply place over a should to carry to and from a vehicle. If rigid members are used in the pockets forming the side panels, there can be multiple rigid members, for example, two triangular members which permit the side panels to easily fold along a stitching separating the triangular members. Safety straps can also be provided and stitched to an interior of one or more of the panels to aid in securing and retaining a child.

Other objects and advantages will be apparent from viewing the drawings and reading the detailed description.

DETAILED DESCRIPTION OF PREFERRED EMBODIMENT

Figure 1:
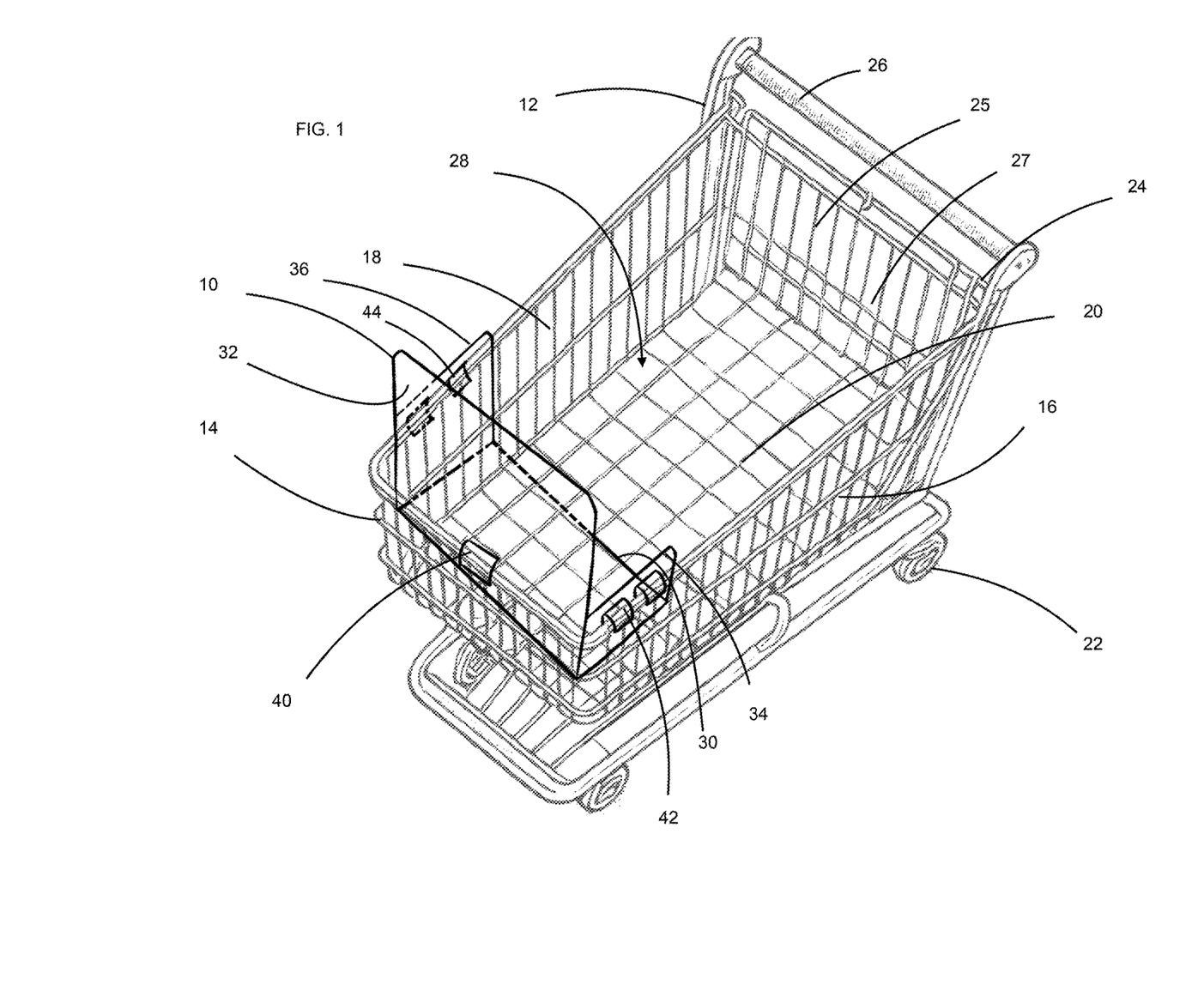
FIG. 1 is a perspective view of the child seat of the invention in use mode in the shopping cart.
Figure 2:
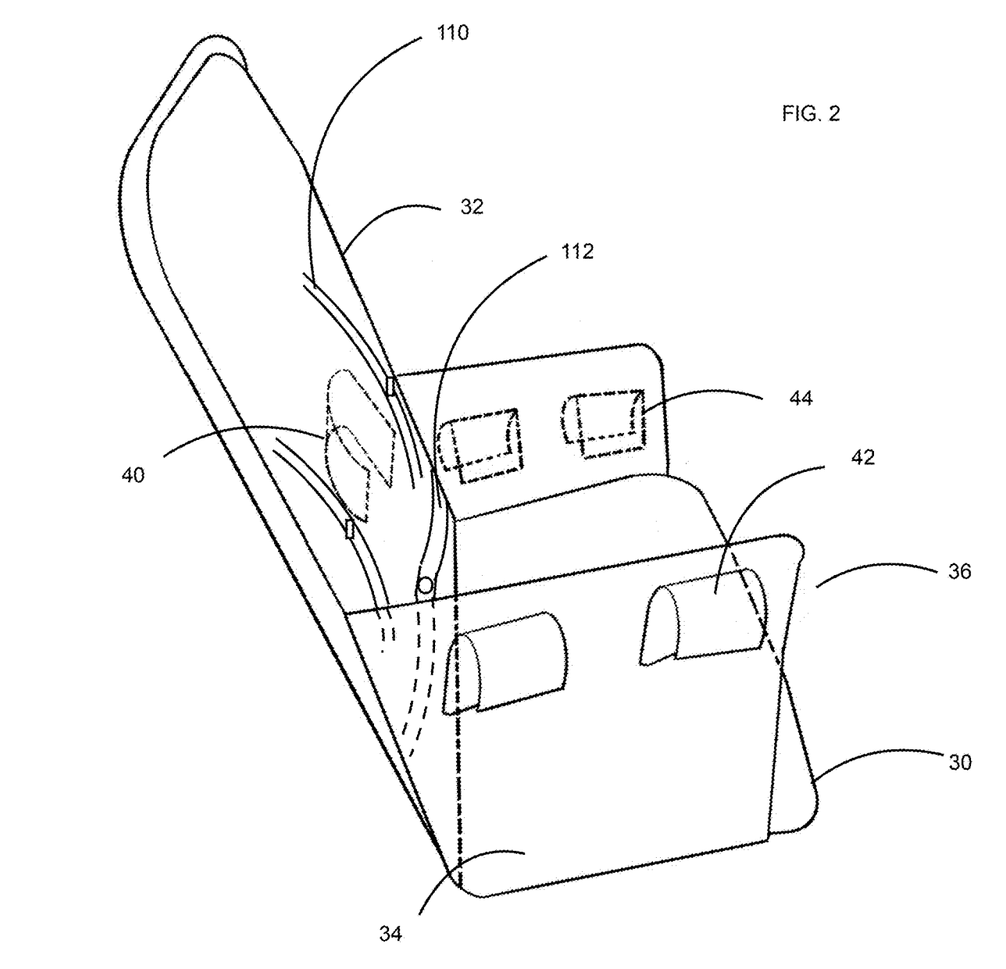
FIG. 2 is a perspective view of a child seat of the invention.
Figure 3:
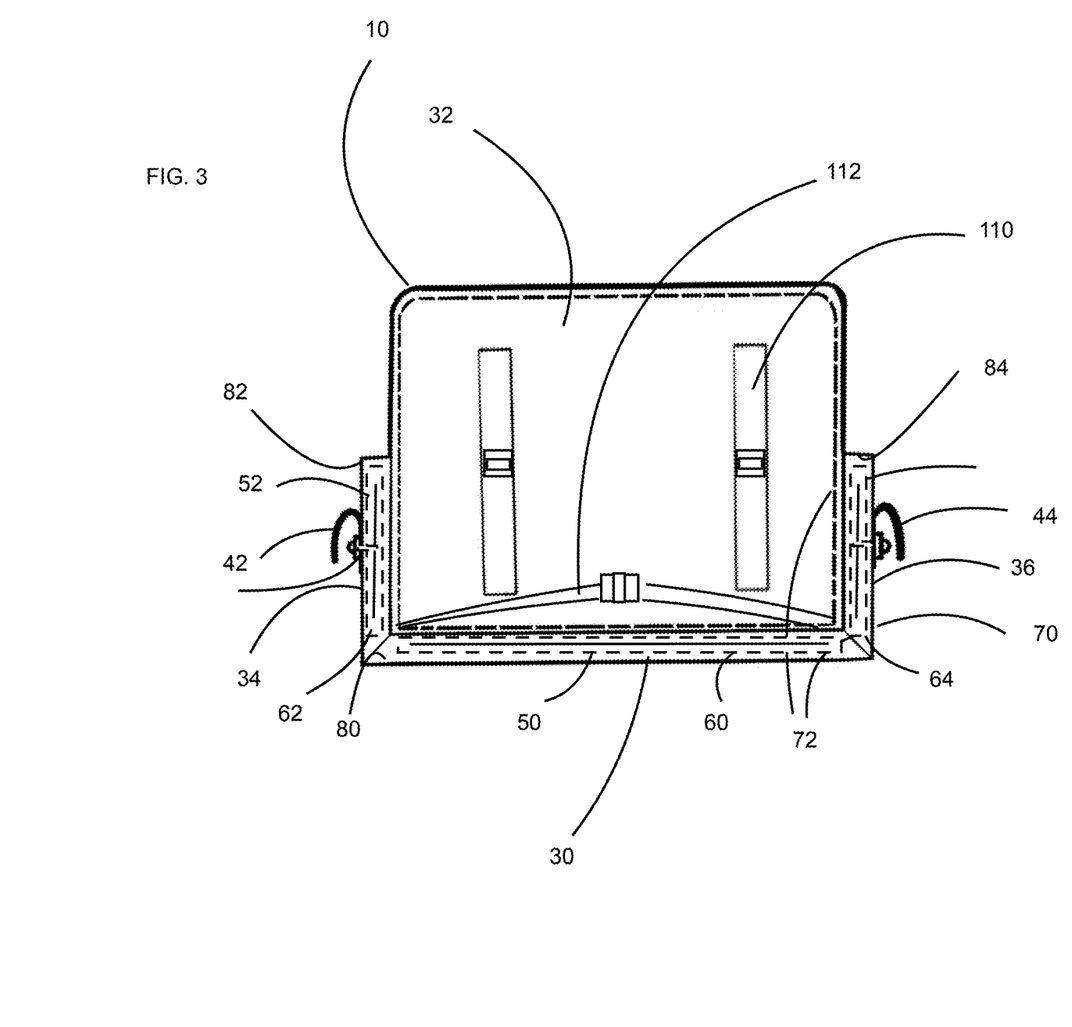
FIG. 3 is a front view of the child seat of the invention.
Figure 4:
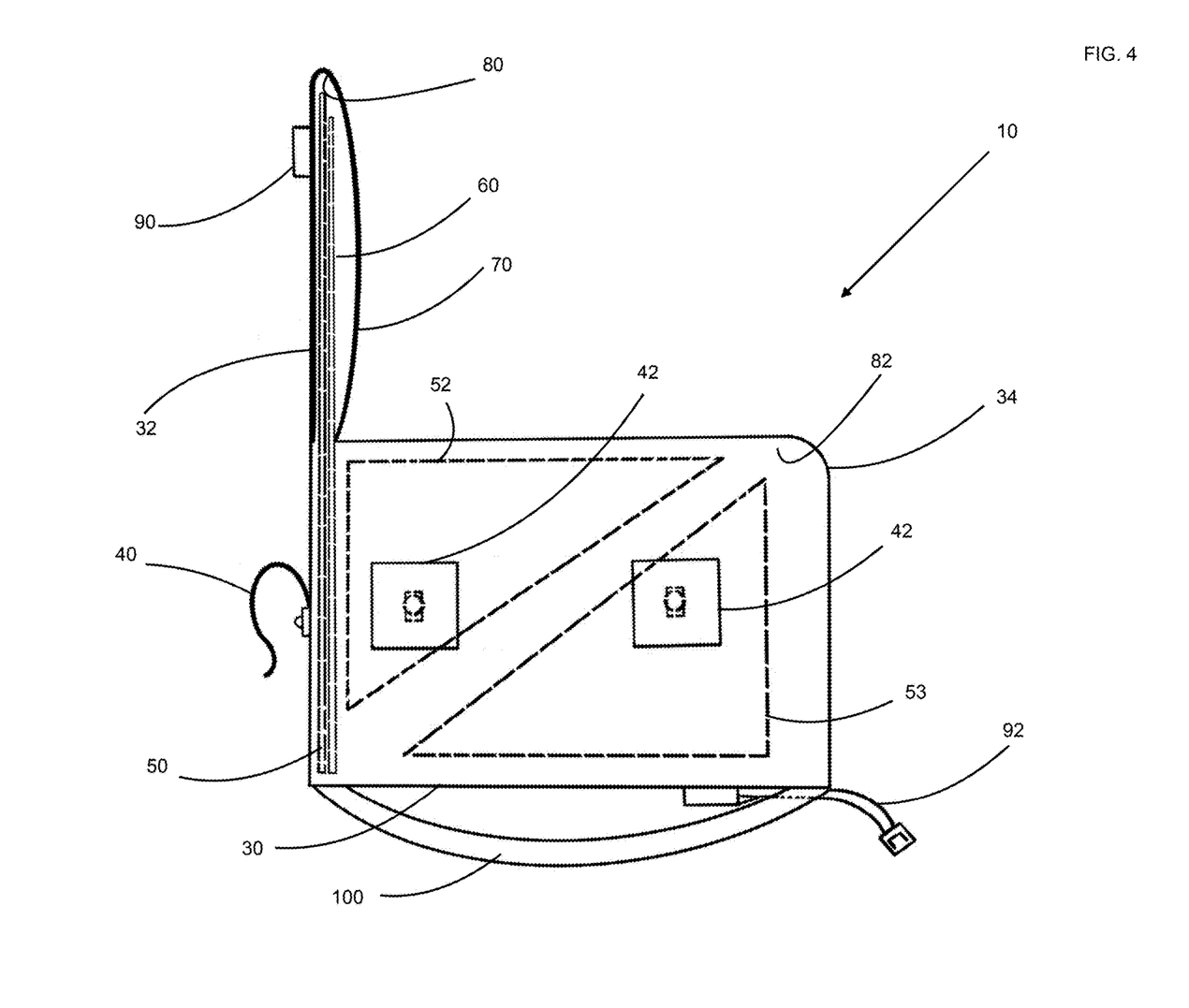
FIG. 4 is a side view of the child seat of the invention.
Figure 5:
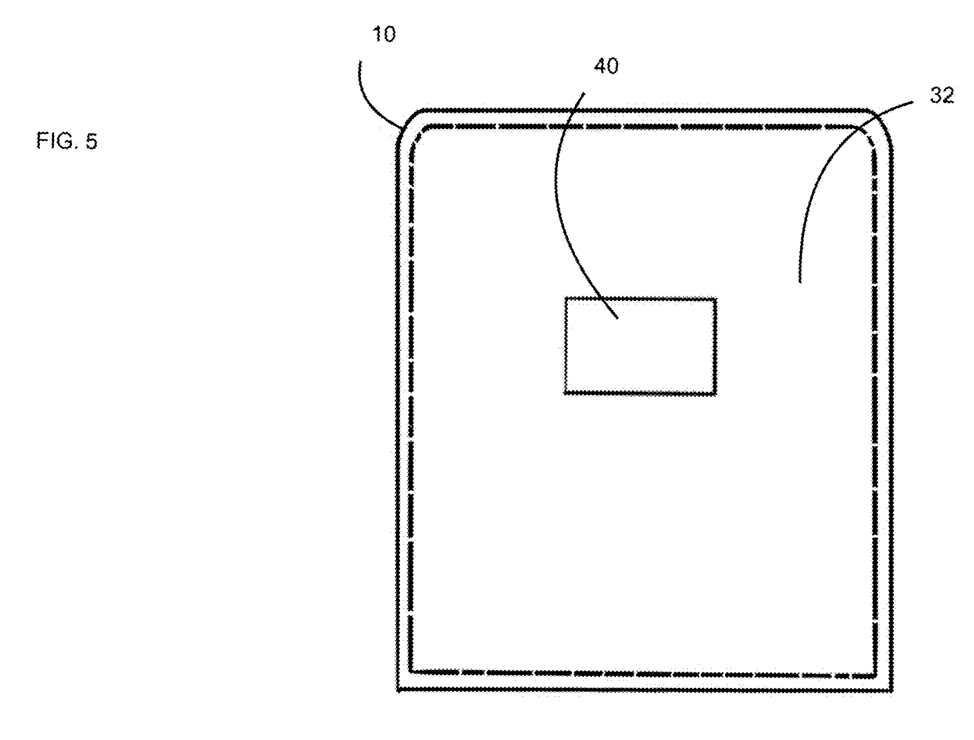
FIG. 5 is a back view of the child seat of the invention.

Referring now to the drawings, a child seat according to the invention is generally designed by the numeral 10. The child seat 10 can preferably be adaptable for use in a shopping cart 12 which can be of various sizes. The shopping cart 12 is defined by a front frame 14, side frames 16, 18 and bottom frame 20, and a plurality of wheels 22 operably connected to the bottom frame 20 An intermediate frame 25 can be provided and can pivot from a closed to open position and includes an attached child seat fame 27 as is known in the art. A rear frame 24 of the shopping cart 12 includes a handle 26 for pushing the shopping cart 12. The dimensions of shopping cart 12 can vary, but exemplary measurements are set forth.

The front frame 14 includes a basket or goods retaining area 28 which can be about 28 inches high, while the rear frame 24 can be about 35 inches high. The handle 26 of a shopping cart 12 can be between 35 inches and 44 inches high. The shopping cart 12 can have a width of about 24 inches.

The transportable child seat 10 is designed for use in the goods retaining area 28 of shopping cart 12 defined by a front frame 14, side frames 16, 18 and bottom frame 20 and an intermediate frame 25. The front frame 14 and side frames 16, 18 interconnect to include a continuous top edge 19.

The child seat 10 includes a bottom panel 30, back panel 32 connected to the bottom panel 30, side panels 34 and 36 connected to the bottom panel 30 and the back panel 32. The bottom panel 30 and the back panel 32 are of at least a width W1 less than a width W of the bottom frame 20 defining space between side frames 22 and 24. The side panels 34 and 36 and back panel 32 have a vertical length L1 (or height) and the front frame 14 and side frames 16, 18 have a vertical length L2 and L3 (or height). For example, the side frames 16, 18, rear frame 24 and front frame 14 typically have a vertical length of between 2 to 3 feet.

Figure 6:
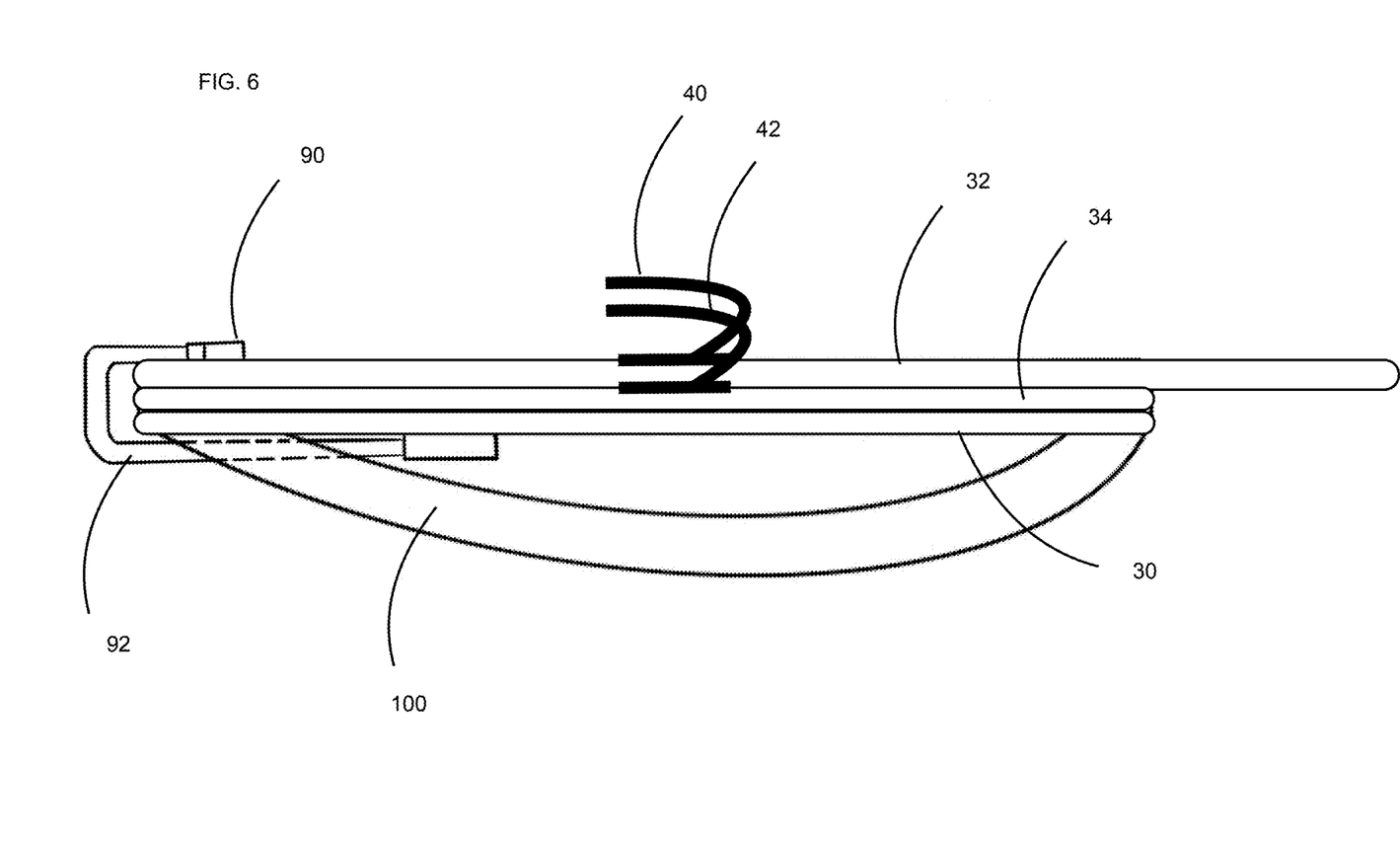
FIG. 6 is a perspective view of the child seat of the invention in a storage and transport mode showing one style of hook.
Figure 7:
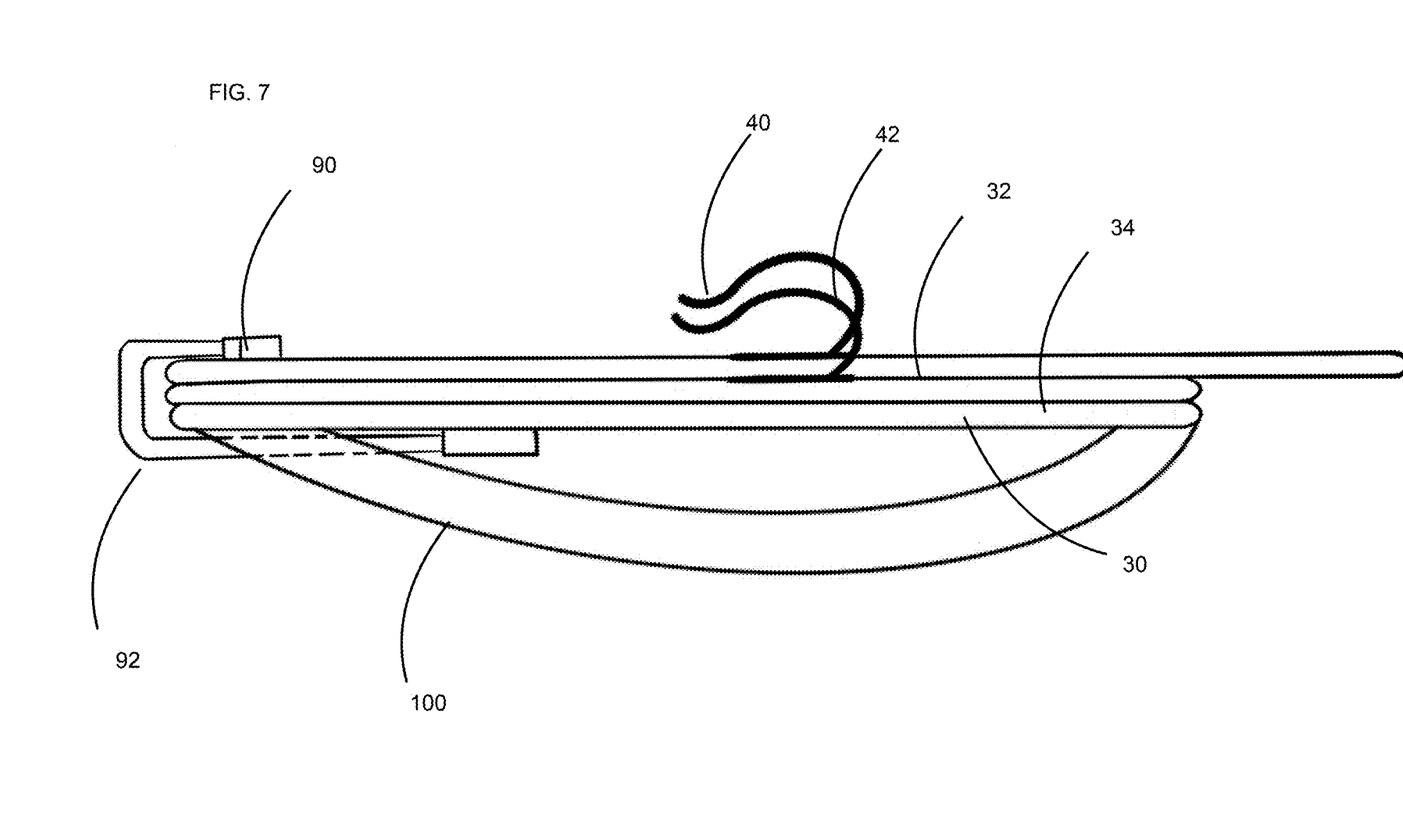
FIG. 7 is a perspective view of the child seat of the invention in a storage and transport mode showing another style of hook.
Figure 8:
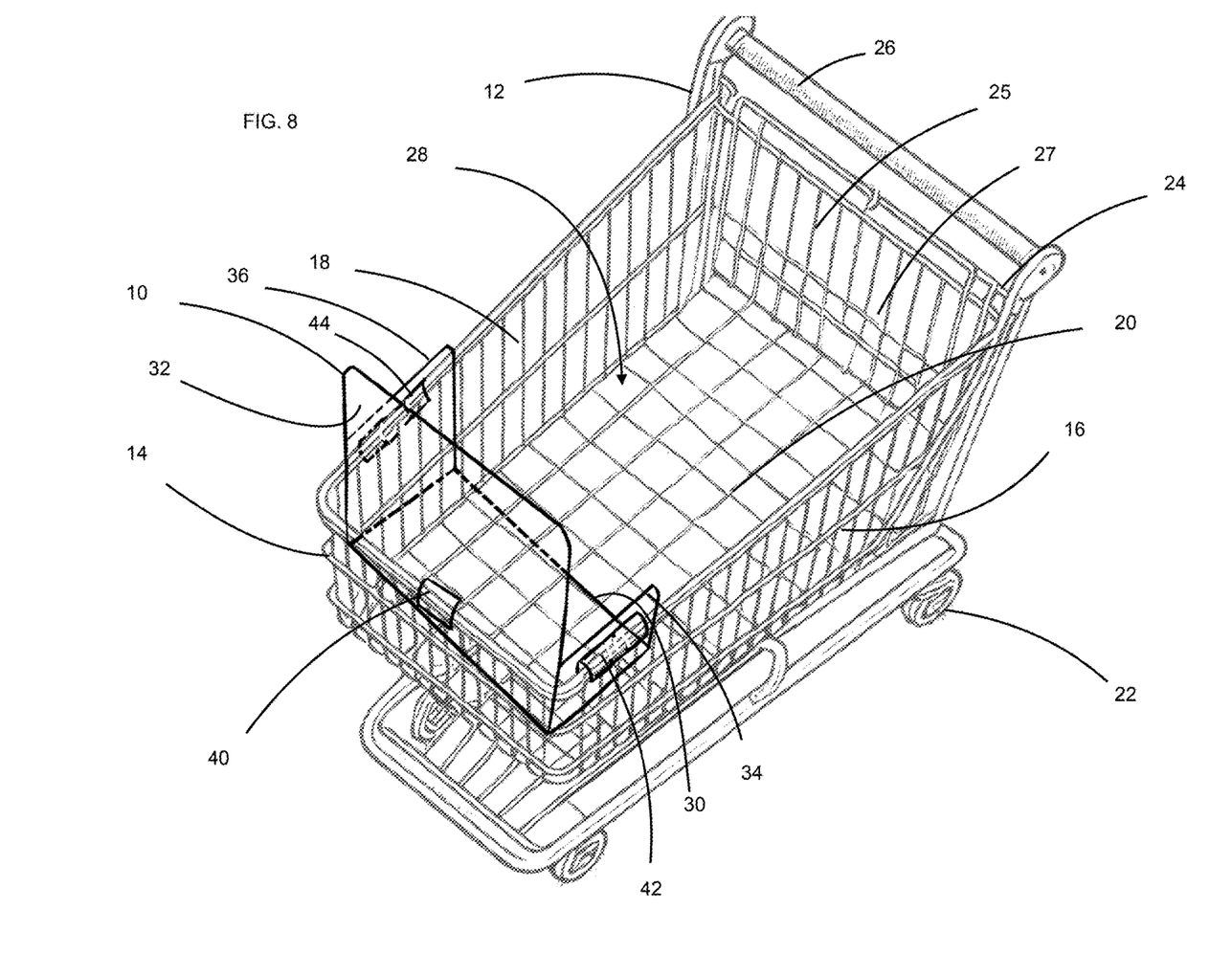
FIG. 8 shows another version of elongated hooks employed on the invention.

An exterior of each of the back panel 32 and side panels 34, 36 include an inverted hook 40, 42 and 44, respectively, which can be of similar configuration and are vertically disposed from the bottom panel 30 such that when the hook 40 of the back panel 32 is disposed over the top edge 19 of the front frame 14 and the hooks 42, 44 of the side panels 34, 36 are disposed over the top edge 19 of the side frames 16, 18, the bottom panel 30 is retained in a predetermined position, e.g., residing in a horizontal plane or generally parallel to the bottom frame 20 (or non-horizontal plane) and sufficiently but safely spaced from the bottom frame 20 to provide comfort for the child to assume a sitting position with the child's bottom substantially suspended above the bottom frame 20, e.g., 12-18 inches above the same. There can be provided a slotted surface 41, 43 and 45 in hook 40, 42 and 44, respectively, to receive a bolt 46, 47, 48 which can be connected to panels, 50, 52, 53, 54, 55, respectively. This permits the hooks 40, 42 and 44 limited vertical travel to accommodate for slight height and incline differences of front frame 14 and side frames 16 and 18. Note, it is contemplated hooks 42 and 44 are shown in pairs, but it is envisioned only one need be provided and can be of a sufficient width to provide needed support. Additionally, hook 40 is shown with an exemplary different configuration to provide a clamping effect onto front frame 14. Side hooks 42 and 44 are shown U shaped in FIG. 6, to provide for ease of removability, but can be modified if desired for more security as seen in FIG. 7.

Accordingly, the side panels 34, 36 and back panel 32 can have a height of about 12 to 16 inches, for example, providing suitable back height support. The bottom panel 30 and optionally the back panel 32 and side panels 34, 36 can include a rigid internal member 50, 52, 54 and 56, which can be made of plastic or metal plate for example. The panels 30, 32, 34, 36 can each include a cushion 60, 62, 64, 66, respectively, such as open cell foam. A fabric cover material 70 which is preferably machine washable is provided to cover the rigid internal members 50, 52, 54 and 56 and cushions 60, 62, 64, 66 and the respective panels 30, 32, 34, 36 can be formed in fabric material 70 with stitching 72 creating pockets 80, 82, 84, 86 to contain the rigid internal members 50, 52, 54 and 56 and cushions 60, 62, 64, 66, respectively.

In one embodiment, the pockets 82, 84 for the side panels 34, 36 can include only cushions 62, 64, which provides for easy folding, closing and mating the panels 30, 32, 34, 36 together for transport by bending the side panels 34, 36 inwardly or outwardly. On the back panel 32 and bottom panel 30, one can have a complementary female clip portion 90 and the other a male clip portion 92 to interconnect these together in a transport mode. Additionally, the seat 10 can includes a carrying strap 100 connected to one of the panels 30, 32, 34, 36. In one example, the exterior of the bottom panel 30 includes the strap 100 so that when in transport mode, the parent can simply place the strap 100 over a shoulder to carry to and from a vehicle. In another embodiment, in the pockets 82, 84 forming the side panels 34, 36, there can be pairs of rigid members 52, 53, and 54, 55, for example, each having a triangular shape, which permit the side panels 34, 36 to easily fold along a stitching separating the triangular members 52, 53, 54, 55. Safety straps 110, 112 can be provided and stitched to an interior of one or more of the panels 30, 32, 34, 36 to aid in securing and retaining a child.

While exemplary embodiments incorporating the principles of the present disclosure have been disclosed herein above, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A transportable child seat for use in a goods retaining area shopping cart defined by a front frame, side frames and bottom frame, wherein a rear frame of the shopping cart includes a handle for pushing the cart, wherein the front frame and side frames interconnect and includes a continuous top edge, which includes:

a bottom panel;

a back panel connected to said bottom panel;

a pair of side panels connected to said bottom panel and said back panel, wherein said bottom panel and said back panel are of at least a width slightly less than a width of said bottom frame; and an exterior of each of said back panel and said side panels include an inverted hook which are substantially equally vertically disposed from said bottom panel such that when said hook of said back panel is disposed over the top edge of the front frame and said hooks of said side panels are disposed over the top edge of the side frames, said bottom panel is retained in a predetermined position above the bottom frame and below the top edge of the side frames spaced from the bottom frame to enable a child to assume a sitting position with said bottom panel suspended above the bottom frame.

2. The transportable child seat of claim 1, which includes said side panels and said back panel have a vertical length which is less than the vertical length of the front frame and side frames and wherein said panels include a cushion and fabric cover material.

3. The transportable child seat of claim 2, wherein said cushions are disposed in a unitary fabric member with stitching creating a pocket to contain said cushion.

4. The transportable child seat of claim 3, wherein said back panel and said bottom panel can have a complementary male and female clip portion respectively to interconnect said panels in a transport mode and wherein said seat includes a carrying strap connected to one of said panels.

5. A transportable child seat for use in a goods retaining area shopping cart defined by a front frame, side frames and bottom frame, wherein a rear frame of the shopping cart includes a handle for pushing the cart, wherein the front frame and side frames interconnect and includes a continuous top edge, which includes:
 a bottom panel;
 a back panel connected to said bottom panel;
 a pair of side panels connected to said bottom panel and said back panel, wherein said bottom panel and said back panel are of at least a width slightly less than a width of said bottom frame; and
 an exterior of each of said back panel and said side panels include an inverted hook which are substantially equally vertically disposed from said bottom panel such that when said hook of said back panel is disposed over the top edge of the front frame and said hooks of said side panels are disposed over the top edge of the side frames, said bottom panel is retained in a predetermined position above the bottom frame and spaced from the bottom frame to comfortably enable the child to assume a sitting position with the bottom panel suspended above the bottom frame, wherein said bottom panel includes a rigid internal member.

6. The transportable child seat of claim 5, which includes said side panels and said back panel have a vertical length which is less than the vertical length of the front frame and side frames.

7. The transportable child seat of claim 5, wherein said back panel includes a rigid internal member.

8. The transportable child seat of claim 7, wherein said seat is machine washable.

9. The transportable child seat of claim 7, wherein said back panel is disposed in a unitary fabric member with stitching creating a pocket to contain said rigid internal member.

10. The transportable child seat of claim 5, wherein said side panels include at least one rigid internal member.

11. The transportable child seat of claim 10, wherein said side panels are disposed in a unitary fabric member with stitching creating a pocket to contain said rigid internal member.

12. The transportable child seat of claim 10, wherein said each said side panel includes a pair of opposing triangular rigid internal members.

13. The transportable child seat of claim 5, wherein said panels include a cushion and fabric cover material.

14. The transportable child seat of claim 13, wherein said cushions are disposed in a unitary fabric member with stitching creating a pocket to contain said cushion.

15. The transportable child seat of claim 5, wherein said bottom panel is disposed in a unitary fabric member with stitching creating a pocket to contain said rigid internal member.

16. The transportable child seat of claim 5, wherein said back panel and said bottom panel can have a complementary male and female clip portion respectively to interconnect said panels in a transport mode.

17. The transportable child seat of claim 5, wherein said seat includes a carrying strap connected to one of said panels.

18. The transportable child seat of claim 5, which includes safety straps connected to one or more of said panels to aid in securing and retaining a child.

19. The transportable child seat of claim 5, wherein said predetermined position resides in one of a horizontal plane and non horizontal plane.

20. The transportable child seat of claim 5, wherein said hooks are configured in one of a clamping form and non-clamping form.

* * * * *